United States Patent [19]

Kim et al.

[11] Patent Number: 5,552,908
[45] Date of Patent: Sep. 3, 1996

[54] LIQUID CRYSTAL COMPENSATION CELL INCLUDING A PAIR OF COMPENSATING PLATES FOR LCD AND METHOD OF MANUFACTURING THE SAME

[75] Inventors: Si-hwan Kim, Seoul; Jin-oh Kwak, Kyunggi-do, both of Rep. of Korea

[73] Assignee: Samsung Display Devices Co., Ltd., Kyunggi-do, Rep. of Korea

[21] Appl. No.: 377,289

[22] Filed: Jan. 23, 1995

[30] Foreign Application Priority Data

Jan. 24, 1994 [KR] Rep. of Korea ............... 1994-1220

[51] Int. Cl.[6] ............... G02F 1/1347; G02F 1/1335; G02F 1/1337; G02F 1/1333
[52] U.S. Cl. ............... 359/53; 359/73; 359/76; 359/102
[58] Field of Search ............... 359/53, 73, 102, 359/76

[56] References Cited

U.S. PATENT DOCUMENTS

| | | | |
|---|---|---|---|
| 4,533,214 | 8/1985 | Penz et al. | 359/63 |
| 4,813,770 | 3/1989 | Cleve et al. | 359/65 |
| 4,941,737 | 7/1990 | Kimura | 359/102 |
| 5,089,906 | 2/1992 | Ohnishi et al. | 359/102 |
| 5,179,457 | 1/1993 | Hirataka et al. | 359/73 |
| 5,241,408 | 8/1993 | Ishikawa et al. | 359/53 |
| 5,400,158 | 3/1995 | Ohnishi et al. | 359/53 |

FOREIGN PATENT DOCUMENTS

| | | | |
|---|---|---|---|
| 4-4022 | 1/1992 | Japan | 359/73 |
| 4-56803 | 2/1992 | Japan | 359/73 |
| 4-141622 | 5/1992 | Japan | 359/73 |
| 4-311902 | 11/1992 | Japan | 359/73 |

Primary Examiner—William L. Sikes
Assistant Examiner—Ron Trice
Attorney, Agent, or Firm—Christie, Parker & Hale, LLP

[57] ABSTRACT

A film type compensation cell for an LCD which compensates for the twist angle of the liquid crystal in the LCD. The compensation cell has two compensation films, having orientation grooves formed on the surfaces thereof. Liquid crystal is between the two compensation films and is twisted in an opposite direction of the liquid crystal in the LCD. Compensation cells can be manufactured by forming orientation grooves on the surfaces of the compensation films and applying a liquid crystal therebetween. The compensation films are then pressed together and cut to the requisite size.

5 Claims, 2 Drawing Sheets ent cell for an LCD(Liquid Crystal Display) and a method of manufacturing the same, and, more particularly, to a thin film type compensation cell for an LCD which has a compensation effect equal to that of a double STN (Super Twist Nematic) LCD and a method of manufacturing the same.

LIQUID CRYSTAL COMPENSATION CELL INCLUDING A PAIR OF COMPENSATING PLATES FOR LCD AND METHOD OF MANUFACTURING THE SAME

BACKGROUND OF THE INVENTION

1. Field of the Invention

The present invention relates to a film type compensation cell for an LCD(Liquid Crystal Display) and a method of manufacturing the same, and, more particularly, to a thin film type compensation cell for an LCD which has a compensation effect equal to that of a double STN (Super Twist Nematic) LCD and a method of manufacturing the same.

2. Description of the Prior Art

The light reflecting characteristic of the liquid crystal is changed in accordance with the voltage applied from the outside. And the LCD is a device for displaying characters, numbers, pictures and the like by using the dielectric characteristic of the liquid crystal.

A conventional LCD includes two parallel glass substrates between which spacers are inserted to maintain a constant gap between the glass substrates and the gap is filled with liquid crystal.

When an electric field is formed between opposing transparent electrodes disposed between the two glass substrates, the liquid crystal is twisted to a direction prescribed by an orientation layer disposed between the glass substrates by the dielectric anisotropy of the liquid crystal such that incident light from the outside is refracted by, or passed through the molecules of the liquid crystal arranged in the prescribed direction.

To colorize the LCD, the liquid crystal cell must be black and white. However, in a known STN LCD, when the twisted angle of the liquid crystal is 240 degrees, the light passing through a cell of liquid crystal is elliptically polarized so that the liquid crystal cell has the color of yellow, green, blue and the like.

A double STN LCD has been made to compensate for the color of this prior art STN LCD. In this double STN LCD, if a twisted angle of the liquid crystal molecules in a driving cell is +240 degrees, a compensation cell having a twisted angle of −240 degrees is piled up on the driving cell to compensate for the color of the driving cell.

In this double STN LCD, the driving cell has a common electrode and segment electrode, and the compensation cell has an orientation layer restricting the twisted angle of the liquid crystal only.

This double STN LCD is too thick. That is, the double STN LCD includes two liquid crystal cells each having two glass substrates that are expensive and thick.

To solve the above problems, a method for compensating for the color by using a compensation film having an optical anisotropy is known. In this method, a sheet of compensation film is piled up on the upper and lower sides of the driving cell of the LCD to compensate for the color of the STN LCD to the black/white. But, while this type of the LCD having the compensation films is thin enough, the compensation effects are not good enough.

Further, while the optical characteristic of the driving cell of the STN LCD changes when there is a temperature change, the optical characteristic of the compensation film does not change when there is a temperature change and it is difficult to effectively compensate for the color, and, therefore, the contrast of the LCD deteriorates as the temperature changes.

SUMMARY OF THE INVENTION

The present invention overcomes the problems and disadvantages of the conventional art by providing a film type compensation cell for an LCD, which has color compensation effects equal to that of a double STN LCD, and, at the same time, can make the thickness of the LCD thin.

Also, the present invention provides a method for manufacturing the film type compensation cell for the LCD.

Additional features and advantages of the invention will be set forth in part in the description which allows, and in part will be obvious from the description, or may be learned by practice of the invention. The objects and advantages of the invention will be realized and attained by means of the elements and combinations partially pointed out in the appended claims.

To achieve the objectives in accordance with the purpose of the invention, as embodied and broadly described herein, the invention comprises two compensation films each with orientation grooves formed on one surface thereof and liquid crystal which is inserted between the two compensation films and is twisted in the opposite direction of liquid crystal in a driving cell of the LCD. This compensation cell can be manufactured by forming orientation grooves on opposite surfaces of the compensation films by jetting gas of a high temperature and pressure in a prescribed direction; then disposing the compensation films toward each other; then applying the liquid crystal between the compensation films, then pressing the compensation films against each other by a roller coating machine; and then cutting and sealing the pressed compensation films to a required size by a heat-cutting apparatus. The orientation grooves are formed by scratching the surfaces of the compensation films at a transition temperature with a nozzle having injection holes arranged uniformly with a prescribed angle with respect to the compensation films.

The film type compensation cell according to the present invention is advantageous in that this film type compensation cell has the compensating effects equal to that of the compensation cell of a double STN LCD but is thin.

Further, in contrast to the compensation film of the prior art, the characteristic of the compensation film is changed with the driving cell whose optical characteristic is changed when there is a change of temperature, thereby preventing the contrast from deteriorating.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

Figure 1:
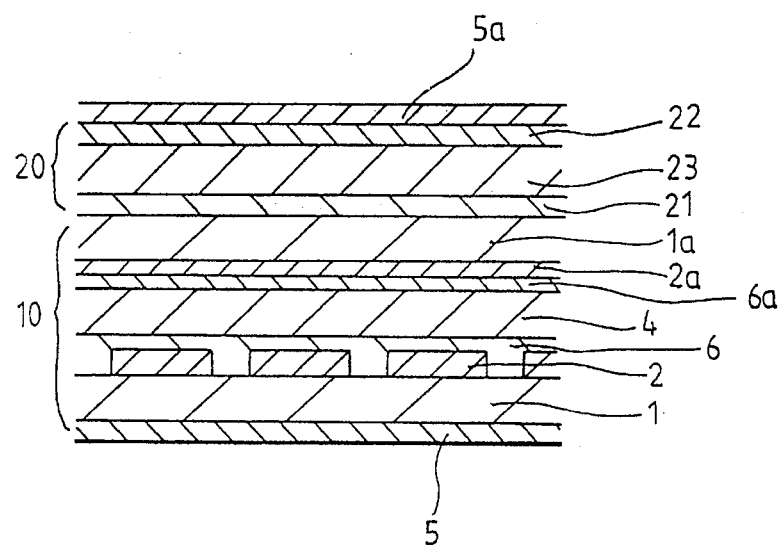
FIG. 1 is a schematic section view showing an LCD having a film type compensation cell in accordance with an embodiment of the invention.

In FIG. 1, a driving cell 10 comprising an LCD is shown. The driving cell 10 includes upper and lower transparent substrates 1 and 1a. ITO transparent electrodes 2 and 2a are formed on the inside of the upper and lower substrates 1 and 1a, and orientation layers 6 and 6a are disposed on the ITO transparent electrodes 2 and 2a, respectively. Liquid crystal 4 having the dielectric anisotropic characteristic is inserted and restricted between the orientation layers 6 and 6a.

The liquid crystal, which is between the transparent electrodes 2 and 2a facing each other between glass substrates 1 and 1a, is twisted to the direction defined by the orientation layer 6 and 6a. If an electric field is formed, liquid crystal molecules move to the direction of the electric field so that the incident light from the outside is refracted and passed, whereby this driving cell 10 produces pictures.

Compensation is achieved by piling the compensation cell 20 up on the driving cell 10, and sticking polarizing plate 5 and 5a on the outside surfaces of the lower substrate 1 and compensation cell 20.

The compensation cell 20, in contrast to the driving cell 10, does not have transparent electrodes. The compensation cell 20 has orientation grooves restricting the dielectric anisotropy of the liquid crystal. The orientation grooves twist the liquid crystal molecules of the compensation cell 20 in the opposite direction of those of the driving cell 10.

This compensation cell 20 is made by disposing two compensation films 21 and 22, on which the orientation grooves are formed by scratching, and are positioned facing each other disposed liquid crystal 23 between compensation films 21 and 22.

Figure 2:
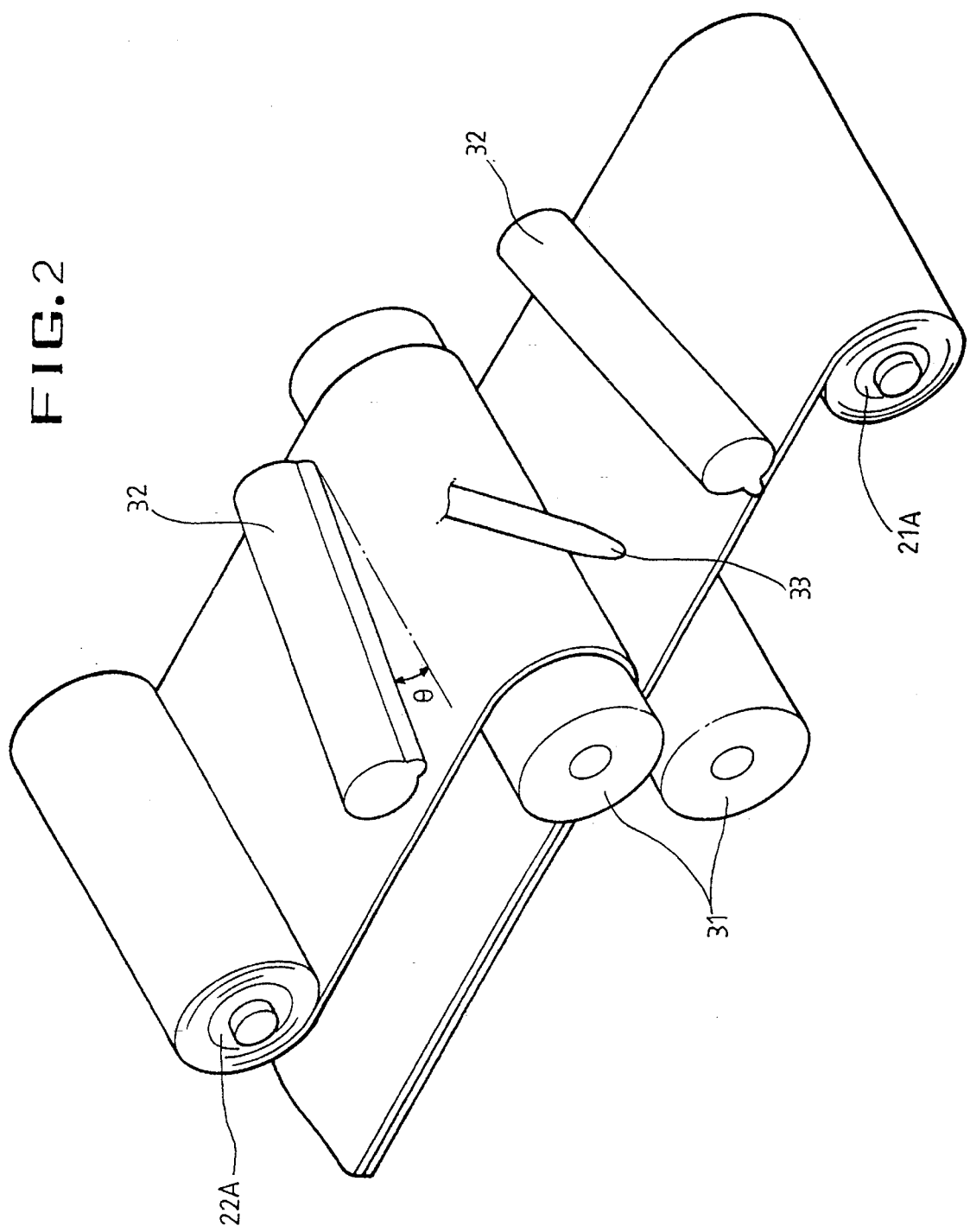
FIG. 2 is a schematic view showing a process for manufacturing a film type compensation cell in accordance with an embodiment of the invention.

In FIG. 2, the compensation films 21A and 22A coiled around rolls are pressed by the roller coating machine 31 and are simultaneously transferred forwardly. The compensation films 21A and 22A are treated to have orientation grooves before they are forwarded to the roller coating machine 31. The orientation grooves are formed by jetting gas of high temperature and pressure through the nozzle 32 having a plurality of injection holes which are disposed in a line to scratch the surface of the compensation films 21A and 22A. The nozzle 32 has an angle (theta) of inclination which is defined in accordance with the dielectric anisotropy of liquid crystal.

Further, the temperature of the gas jetted through the nozzle 32 is the transition temperature of the compensation films 21A and 22A, that is, the temperature in which the compensation films liquify. In case that the compensation films are thermoplastic resin films, the temperature is about 200° C.

The compensation cell 20 is made by applying liquid crystal on the compensation film 21A where the orientation grooves are formed by a dispenser 33. Then the compensation films 21A and 22A are forwarded to the roller coating machine 31 where liquid crystal is coated uniformly on the films and the films 21A and 22A are pressed against each other.

Figure 3:
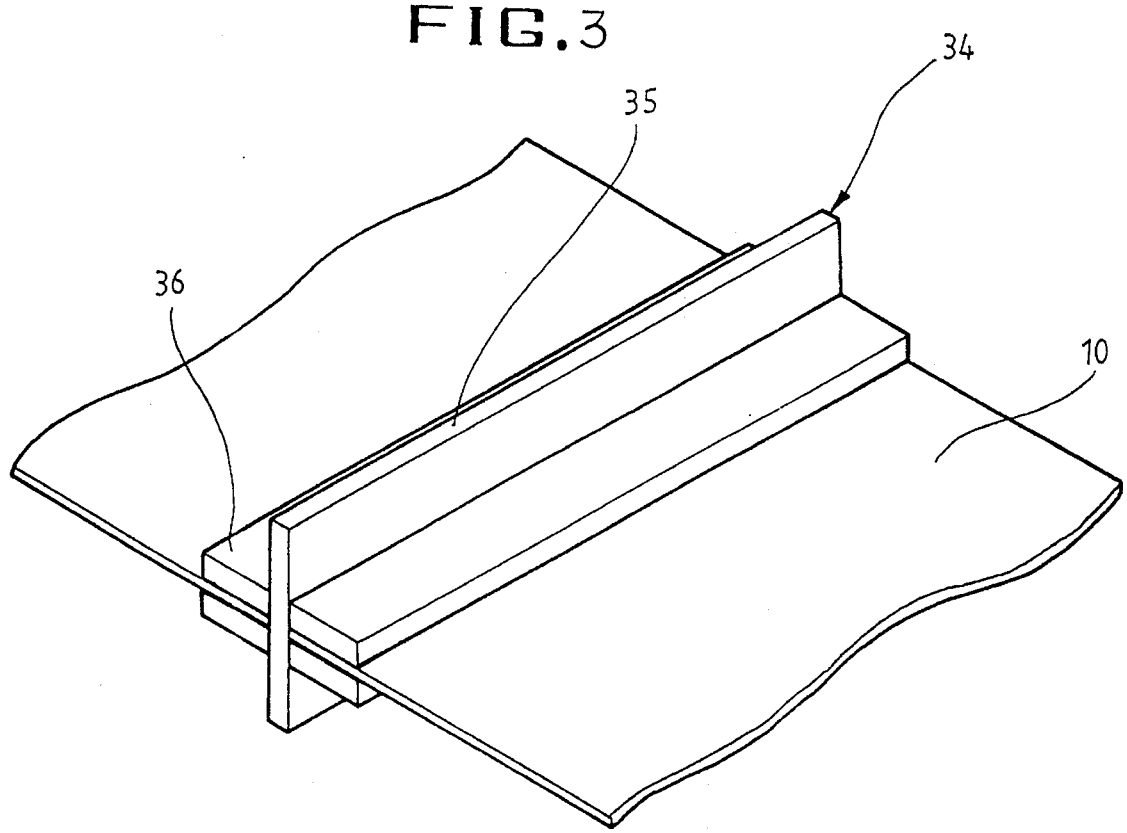
FIG. 3 is a schematic view showing an apparatus for cutting a film type compensation cell in accordance with an embodiment of the invention.

After that, the pressed compensation cell 20 is cut by the cutting apparatus shown in FIG. 3 with a prescribed size and then combined with the driving cell 10. The compensation cell 20 is cut by a blade 35 which is heated to the transition temperature. A press 36 is disposed on each side of the blade 35 for sealing the compensation cell 20 cut by the blade 35.

The compensation cell 20 is piled up on the driving cell 10, and polarizers 5 and 5a are stuck to the outer surfaces, whereby a structure with the properties of an STN LCD with a double cell structure is achieved.

As described above, even though the LCD having the film type compensation cell according to the present invention has a compensation effect equal to that of the double STN LCD, an LCD using the compensation films is thin.

Further, because the optical characteristic of the compensation cell remains the same with that of the driving cell even though the temperature is varies, the contrast of the LCD does not deteriorate.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A compensation cell for an LCD comprising:

two compensation films each with orientation grooves formed on one surface thereof; and liquid crystal which is between the two compensation films and is twisted in an opposite direction from a twist of liquid crystal in the LCD.

2. The compensation cell as claimed in claim 1 wherein the compensation films comprise high polymer resin.

3. A method of manufacturing a compensation cell for an LCD comprising the steps of:

forming orientation grooves on opposing surfaces of two compensation films by jetting gas in a prescribed direction;

disposing the compensation films toward each other;

applying liquid crystal between the compensation films;

pressing the compensation films toward each other with a roller coating machine; and cutting and sealing the pressed compensation films with a heat-cutting apparatus.

4. The manufacturing method as claimed in claim 3 wherein the orientation grooves are formed by scratching said surfaces of the compensation films at a transition temperature with a nozzle, said nozzle having injection holes arranged uniformly at a prescribed angle with respect to the compensation films.

5. The manufacturing method as claimed in claim 3 wherein said compensation films comprise a high polymer resin.

* * * * *

UNITED STATES PATENT AND TRADEMARK OFFICE
CERTIFICATE OF CORRECTION

PATENT NO. : 5,552,908
DATED : September 3, 1996
INVENTOR(S) : Si-hwan Kim; Jin-oh Kwak It is certified that error appears in the above-indentified patent and that said Letters Patent is hereby corrected as shown below:

On the title page, Item [54], in the title replace "COMPENSATING"
    with -- COMPENSATION --.
Column 1, line 2, in the title replace "COMPENSATING" with
    -- COMPENSATION --.
Column 3, line 27, delete "disposed" and insert therefor -- with --.
Column 3, line 27, before "between" insert -- disposed --.
Column 4, line 15, before "varies" delete "is".

Signed and Sealed this

Fifteenth Day of April, 1997

*Attest:*

BRUCE LEHMAN

*Attesting Officer*    *Commissioner of Patents and Trademarks*